(12) United States Patent
Uhlik

(10) Patent No.: US 9,355,072 B2
(45) Date of Patent: May 31, 2016

(54) RECURSIVE EMBEDDING BY URL PARAMETERIZATION

(75) Inventor: Christopher Richard Uhlik, Danville, CA (US)

(73) Assignee: Google Inc., Mountain View, CA (US)

( * ) Notice: Subject to any disclaimer, the term of this patent is extended or adjusted under 35 U.S.C. 154(b) by 715 days.

(21) Appl. No.: 13/607,007

(22) Filed: Sep. 7, 2012

(65) Prior Publication Data

US 2015/0199304 A1 Jul. 16, 2015

Related U.S. Application Data

(60) Provisional application No. 61/540,366, filed on Sep. 28, 2011.

(51) Int. Cl.
| | | |
|---|---|---|
| *G06F 17/22* | (2006.01) | |
| *G06F 17/21* | (2006.01) | |
| *H04L 29/08* | (2006.01) | |
| *G06F 17/30* | (2006.01) | |
| *G06F 17/24* | (2006.01) | |

(52) U.S. Cl.
CPC .......... *G06F 17/211* (2013.01); *G06F 17/2235* (2013.01); *G06F 17/246* (2013.01); *G06F 17/30887* (2013.01); *H04L 67/10* (2013.01)

(58) Field of Classification Search
CPC . G06F 17/211; G06F 17/2235; G06F 3/0481; G06F 17/3089; G06F 17/30876; G06F 9/4843; G06F 9/4856; G06F 17/30554; G06F 17/03887
See application file for complete search history.

(56) References Cited

U.S. PATENT DOCUMENTS

| | | | | |
|---|---|---|---|---|
| 5,963,966 A * | 10/1999 | Mitchell et al. | ............... | 715/236 |
| 6,272,485 B1 * | 8/2001 | Sragner | | |
| 7,219,309 B2 * | 5/2007 | Kaasila et al. | ............... | 715/800 |
| 7,877,677 B2 * | 1/2011 | Wyler et al. | ................... | 715/209 |
| 7,930,384 B1 * | 4/2011 | Lester et al. | .................. | 709/224 |
| 8,037,066 B2 * | 10/2011 | Majko | ........................... | 707/734 |
| 8,346,754 B2 * | 1/2013 | Ravikumar | ....... | G06F 17/30719 707/709 |
| 8,438,471 B2 * | 5/2013 | Thorpe et al. | ................. | 715/234 |
| 8,719,706 B2 * | 5/2014 | Harris et al. | .................. | 715/708 |
| 8,800,048 B2 * | 8/2014 | Wollnik | ................. | G06F 21/14 713/189 |
| 8,825,745 B2 * | 9/2014 | Prish | ........................... | 709/203 |
| 9,047,348 B2 * | 6/2015 | Dayan | | |
| 2009/0044098 A1 * | 2/2009 | Wyler et al. | ................... | 715/234 |
| 2009/0293041 A1 * | 11/2009 | Wollnik | ................. | G06F 21/14 717/110 |
| 2011/0010612 A1 * | 1/2011 | Thorpe et al. | ................. | 715/234 |
| 2012/0096525 A1 * | 4/2012 | Bolgert et al. | .................... | 726/6 |

* cited by examiner

*Primary Examiner* — Maikhanh Nguyen
(74) *Attorney, Agent, or Firm* — Ropes & Gray LLP

(57) ABSTRACT

Methods, systems, and apparatus for performing recursive embedding by URL parameterization are provided. Recursive embedding by URL parameterization may be performed by receiving a display parameter for defining a window display area within a portion of a first document associated with a first application having a first format, and a URL-based identifier specifying a portion of a second document associated with a second application having a second format. The first and second formats are different from each other. A display of the portion of first including the window display area is generated. The specified portion of the second document is displayed within the window display area, and the first and second documents are independently executable with respect to each other.

12 Claims, 5 Drawing Sheets

| Application/ Document Type | URL | Specified URL-Based Identifier |
|---|---|---|
| Image | https://images.com/john.doc/.../ | Left=100 & Right=300 & Top=50 & Bottom=800<br>Image Subset=100, 300, 50, 800 |
| Spread Sheet | https://spreadsheets.google.com/.../ | Cell=B7:C19 |
| Word Processing | https://docs.google.com/.../ | & Lines=36:40<br>& Pages=3:5 |
| Map | https://maps.google.com/.../ | bbox=37.123, -112.765; 37.251, -112.994 |
| Video | http://www.youtube.com/watch... | t=1m32s |

FIG. 3

RECURSIVE EMBEDDING BY URL PARAMETERIZATION

RELATED APPLICATIONS

This application claims benefit, pursuant to 35 U.S.C. §119 (e), to U.S. Provisional Application Ser. No. 61/540,366 filed Sep. 28, 2011, which is hereby incorporated herein by reference in its entirety.

FIELD OF THE INVENTION

The present invention is generally directed to embedded executable computer software applications.

BACKGROUND

Although many computer software applications exist today for performing various specific functions, these applications often do not map perfectly onto what the users want to do. For example, sometimes a user may want to present a portion of a spreadsheet application document in a presentation application document. But while presentation applications are good for presenting, they typically do not allow for performing specialized spreadsheet functions like editing spreadsheet cell formulas.

As an alternative, a user will typically make a "screenshot" of a spreadsheet application document (continuing the same example) by clipping out an image of the spreadsheet document cells they wish to present, and pasting the image into their presentation application document. Oftentimes, however, when the user takes the image the spreadsheet application document outside of its native spreadsheet application, most of the functionality of the spreadsheet application document is lost. The spreadsheet document image is only a static representation of a document associated with a spreadsheet application, rather than an actual functional spreadsheet application document. This limitation has obvious disadvantages. For example, the user may not be able to change the cells in the spreadsheet document image during a presentation because the displayed portion of the spreadsheet application document is static and non-executable. Moreover, even if the user is able to interact with the clipped-out document, the document may be operable only so far as the presentation application is compatible with the spreadsheet application. Specifically, the presentation application must be able to both display and interpret the data from the spreadsheet application.

While some clipboard-type applications allow a user to cut, copy and paste a selected portion of a document associated with a first application into a document associated with a second application, the operational format of the first application must be compatible with the operational format of the second application, sometimes to just merely display the selected portion. Even if an application can interact with a document associated with another application, the user typically has no access to the specialized functionality of the native application that they might need, which may severely limit the usefulness of pasting a portion of a document into another document.

SUMMARY OF THE INVENTION

Systems, methods, and articles of manufacture for recursive embedding by Uniform Resource Locator (URL) parameterization are provided. In accordance with an embodiment, a display parameter for defining a window display area within a portion of a first document associated with a first application having a first format and a URL-based identifier specifying a portion of a second document associated with a second application are received. The first and second executable formats are different from each other. A display of the portion of the first document including the window display area based on the display parameter is generated. The specified portion of the second document is displayed within the window display area based on the URL-based identifier. The second document and the first document are independently executable with respect to each other. The first application and second application may be cloud-based applications. The URL-based identifier may be linked to for displaying the specified portion of the second document within the window display area. The URL-based identifier may include one of a time-based range, cell range, document range or spatial parameter.

In accordance with an embodiment, the specified portion of the second document may be rescaled based on a rescaling parameter and cropped based on a cropping parameter.

In accordance with an embodiment, a URL-based identifier that specifies a portion of a first document associated with a first application having a first format is generated. The portion of the first document is embedded within a defined window display area of a portion of a second document associated with a second application having a second format by linking to the URL-based identifier. The first and second formats are different from each other. The portion of the first document and the portion of the second document are independently executable with respect to each other. The URL-based identifier may be automatically generated based on the selected time-based range, cell range, document range or spatial parameter.

These and other advantages of the invention will be apparent to those of ordinary skill in the art by reference to the following detailed description and the accompanying drawings.

BRIEF DESCRIPTION OF THE DRAWINGS

FIG. 3 is a chart showing exemplary URL-based identifier formats for recursive embedding by URL parameterization;

DETAILED DESCRIPTION

The embodiments herein relate to recursive embedding by Uniform Resource Locator (URL) parameterization. Recursive embedding by URL parameterization generally involves a display parameter for defining a window display area within a portion of a first document associated with a first application, and a URL-based identifier specifying a portion of a second document associated with a second application. A display of the portion of first document including a display of the window display area may be generated based on the display parameter. The URL-based identifier may be linked to for displaying the specified portion of the second document within the window display area.

The URL-based identifier may include one of a time-based range, cell range, document range or spatial parameter. For example, a slide from a presentation application document can be identified by a spatial parameter and embedded into a map application document. The slide can include some spreadsheet cells of a spreadsheet application document that may be identified by a cell range. Those spreadsheet cells might contain an embedded video from a video recording document identified by a time-based range, etc. At each level, only a URL-based identifier is needed to specify the content of a defined display area at that level.

Figure 1:
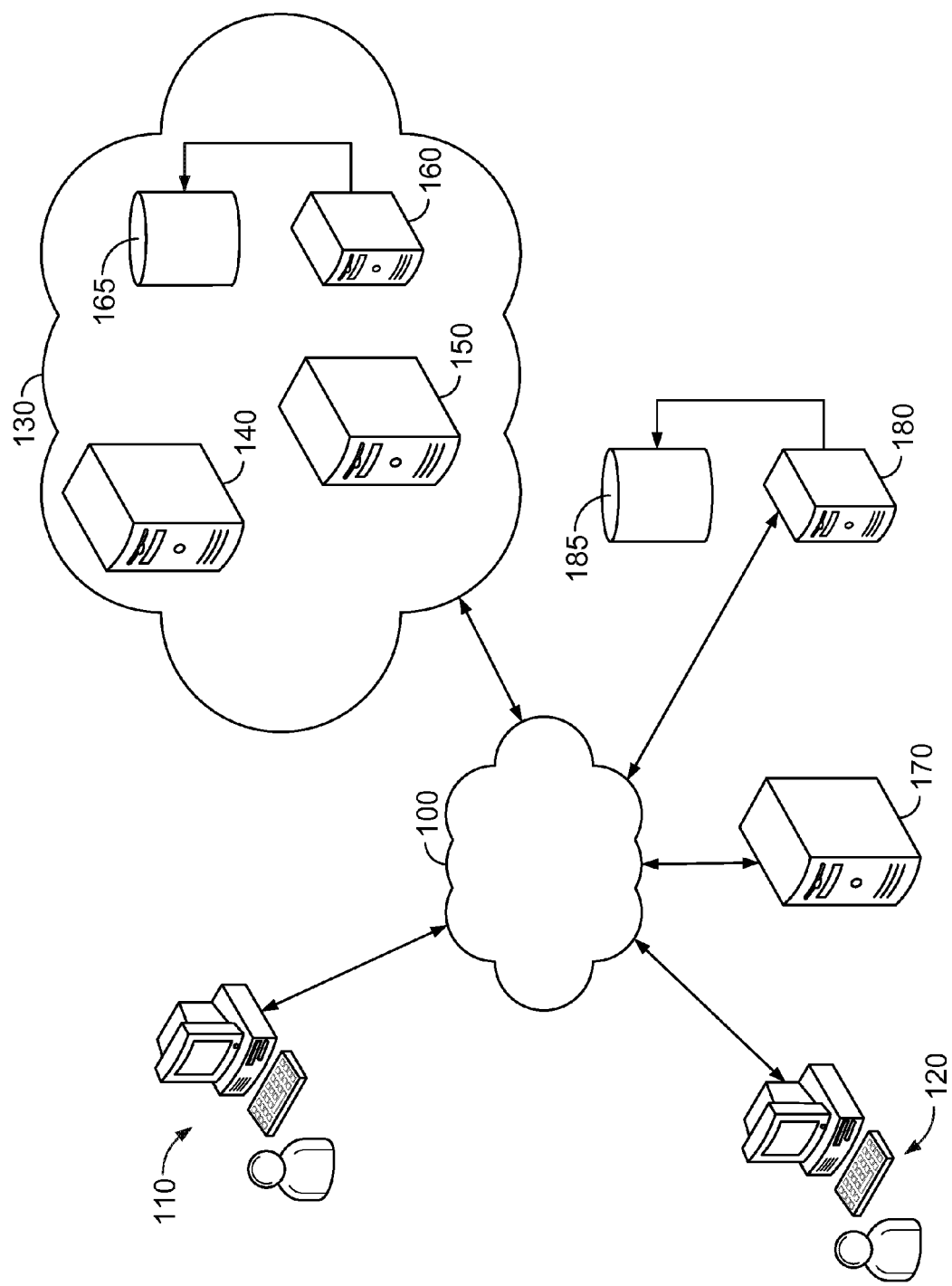
FIG. 1 is a diagram showing a cloud computing environment that may be used for implementing recursive embedding by URL parameterization in accordance with an embodiment.

In one embodiment, the one or both of the first and second applications may be cloud-based applications that are independently executable with respect to each other. By being independently executable, the first application need not have any interaction with the second application once a display parameter for defining the window display area and a URL-based identifier are received. FIG. 1 is a diagram showing a cloud computing environment that may be used for implementing recursive embedding by URL parameterization in accordance with an embodiment. For example, recursive embedding by URL parameterization can be provided through a cloud computing environment 130. As illustrated, users at personal computers, such as computer 110 and computer 120 can implement recursive embedding by URL parameterization with applications provided by cloud 130 via network 100. Within the cloud 130, servers 140, 150, and/or 160 can provide applications and various documents that are associated with applications. For example, server 140 may provide a web-enabled (e.g., cloud-based) application, such as a spreadsheet, photo album, word processor, map or video recording application. The web-enabled application may access information (e.g., associated documents) stored in database 165, accessed via a database server 160, and access to the web-enabled application can be provided via a webpage at server 150. A web-enabled implementation of recursive embedding by URL parameterization can be created using standard technologies.

In a further embodiment, a specific server (e.g. server 170 or server 180) can execute an application configured for recursive embedding by URL parameterization that is accessible by computers 110 and 120. In accordance with this embodiment, a document associated with a network-enabled first application can access a document associated with a second application via the Internet or a standalone network (e.g., an application provided within a company intranet). In an intranet environment, a server 170 executing a network-enabled application can access another network-enabled application from a server 180, which is connected to a database 185. Alternatively, the applications may be independently executable applications provided by a single server.

Figure 2:
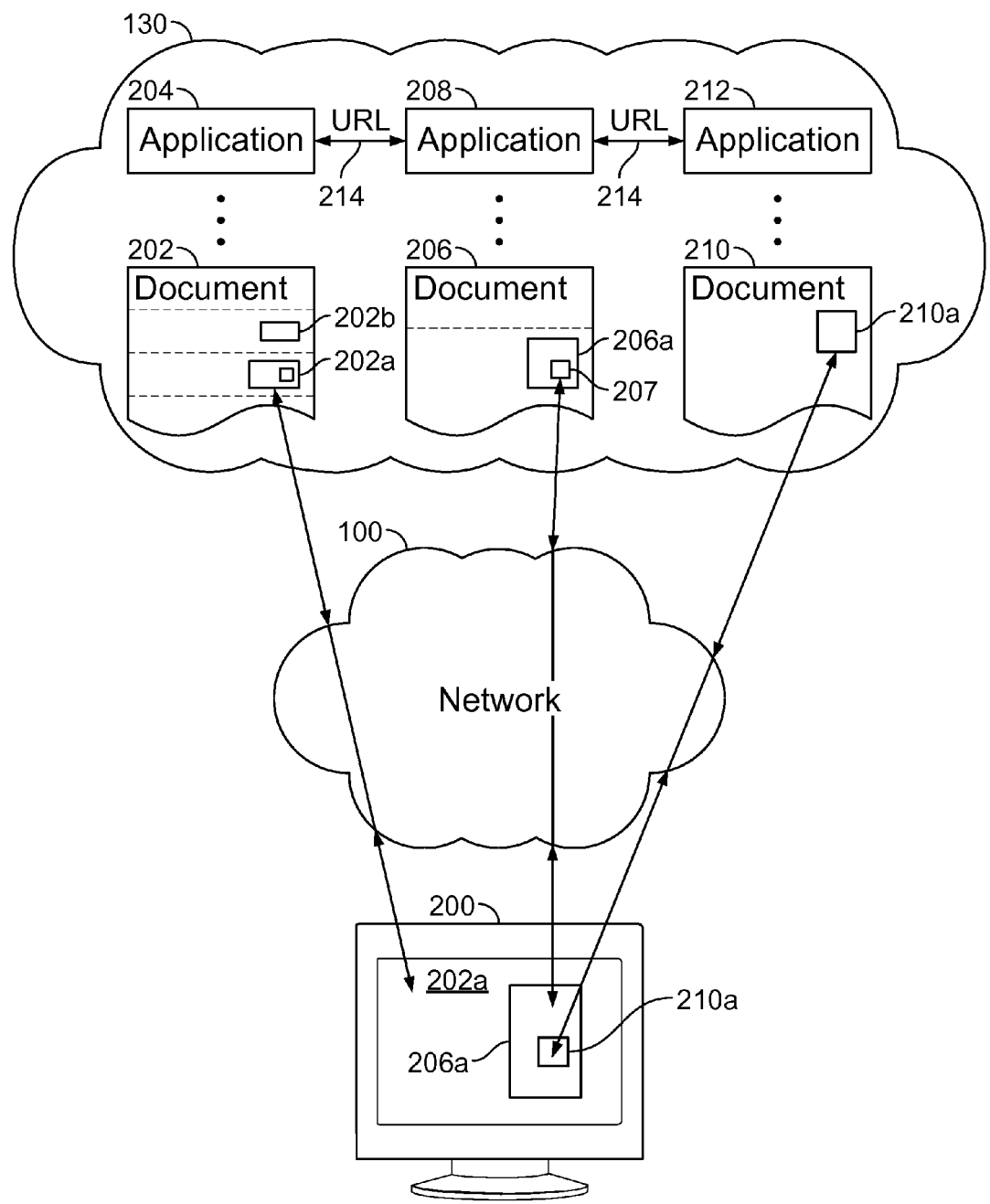
FIG. 2 is a diagram showing recursive embedding by URL parameterization in accordance with an embodiment.

FIG. 2 is a diagram showing recursive embedding by URL parameterization in accordance with an embodiment. In one embodiment, a display 200, such as at computer 110 and computer 120 can be used to present application documents, such as application documents provided by cloud 130 via network 100. For example, a first document 202 associated with a first application 204 presented at display 200 may have a window display area 202a for displaying a portion 206a of a second document 206 associated with a second application 208. The window display area 202a may be defined by a display parameter based on, for example, Cartesian coordinates or instructions for implementing a "pop-up" display sensitive to the presence of an embedded application. Moreover, first document 202 may include more than one defined window display area, e.g., 202b, at various locations (e.g., pages, slides, cells) within the document.

Portions of application documents may be embedded into other application documents recursively. For example, the portion 206a of the second document 206, displayed within the window display area 202a of the document 202, may have a defined window display area 207 for displaying a portion 210a of a third document 210 associated with a third application 212 and so on. As mentioned above, at each level only a URL-based identifier is needed to specify the content of the window display area at that level.

In one embodiment, the documents 202, 206, 210 are associated with applications 204, 208, 212 respectively, that are cloud-based application provided by a cloud, such as cloud 130 via a network, such as network 100. A first document associated with a first cloud-based application may have a format (e.g., a spreadsheet, presentation, word processor, or photo display format) that is different from a format of an embedded portion of a second document associated with a second cloud-based application. Therefore, once a window display area 202a/b, 207 is generated, the first document need not have any interaction with an embedded portion of the second document. As such, the first and second documents can be independently executable with respect to each other.

The exemplary diagram shown in FIG. 2 and the corresponding description is also applicable to documents associated with applications that are not provided by cloud 130, such as a document associated with an application provided by a specific server (e.g., server 170 or server 180).

A URL specifies where on the Internet, or other network, a known resource (e.g., an application or a document associated with an application) is available and serves as a mechanism for retrieving it. A URL generally includes a scheme/protocol, followed by a colon, then, depending on the protocol, a domain name or IP address, a port number, the path of the resource to be fetched or the program to be run, and a query string. A representation such as "http://domain:port/path?query_string#fragment_id" is an example of URL syntax structure.

A URL may also include an identifier that describes specific views into an application document. By using URL-based identifiers, a precise portion of an application document can be described. Further, by being able to describe a precise portion of a document, a user can select the portion to be embedded into the display of a document associated with another application. For example, in the cloud-based network environments of FIGS. 1 & 2, a portion of a document associated with a first application can be embedded within a window display area of a document associated with a second application by linking 214 to a URL-based identifier. As such, one server, e.g., server 140, may execute application 204, while another server, e.g., server 150, may execute application 208, where application 208 is known to application 204 only as a URL-based identifier link 214 to a window display area 202a of an associated document 202.

FIG. 3 is a chart showing exemplary URL-based identifier formats for recursive embedding by URL parameterization. In one embodiment, any application/document type 300 can have a URL 302, including a URL-based identifier 304 that describes specific views into a formatted document associated with an application, such as an image, spreadsheet, word processing, mapping or video recording document.

For example, an image document may describe a specific photo by generating a URL-based identifier specifying a rectangular subset of pixels 306 (e.g., framing a photographic image) or, alternatively, for a subset of images 307. A spreadsheet document may generate a URL-based identifier specifying a sub-range of cells 308. For example, the cell range "B7:C19" may identify all of the cells in a document that are within that range. A word processing document may generate a URL-based identifier specifying line numbers 310 (e.g., for lines on a particular page of a document) or page numbers 311 (e.g., for certain pages of a document), while a map document may generate a URL-based identifier specifying a latitude-longitude bounding box 312 that demarcates a bounded area within a map image. In another example, a video recording document may generate a time-based identifier 314 specifying a particular segment of a video recording. One skilled in the art will note that the URL-based identifiers in FIG. 3 are merely illustrative, and that other identifiers for these and other document types are possible.

In one embodiment, a display parameter (e.g., the Cartesian coordinates of a window display area, a rescaling parameter, a clipping parameter, etc.) for defining a window display area within a portion of a document associated with an application may be received along with a URL-based identifier. For example, a user may specify a display parameter for rescaling or clipping embedded content, such as for fitting content into a defined window display area. In another embodiment, an application may automatically generate a URL-based identifier based on, for example, a rescaling parameter.

Figure 4:
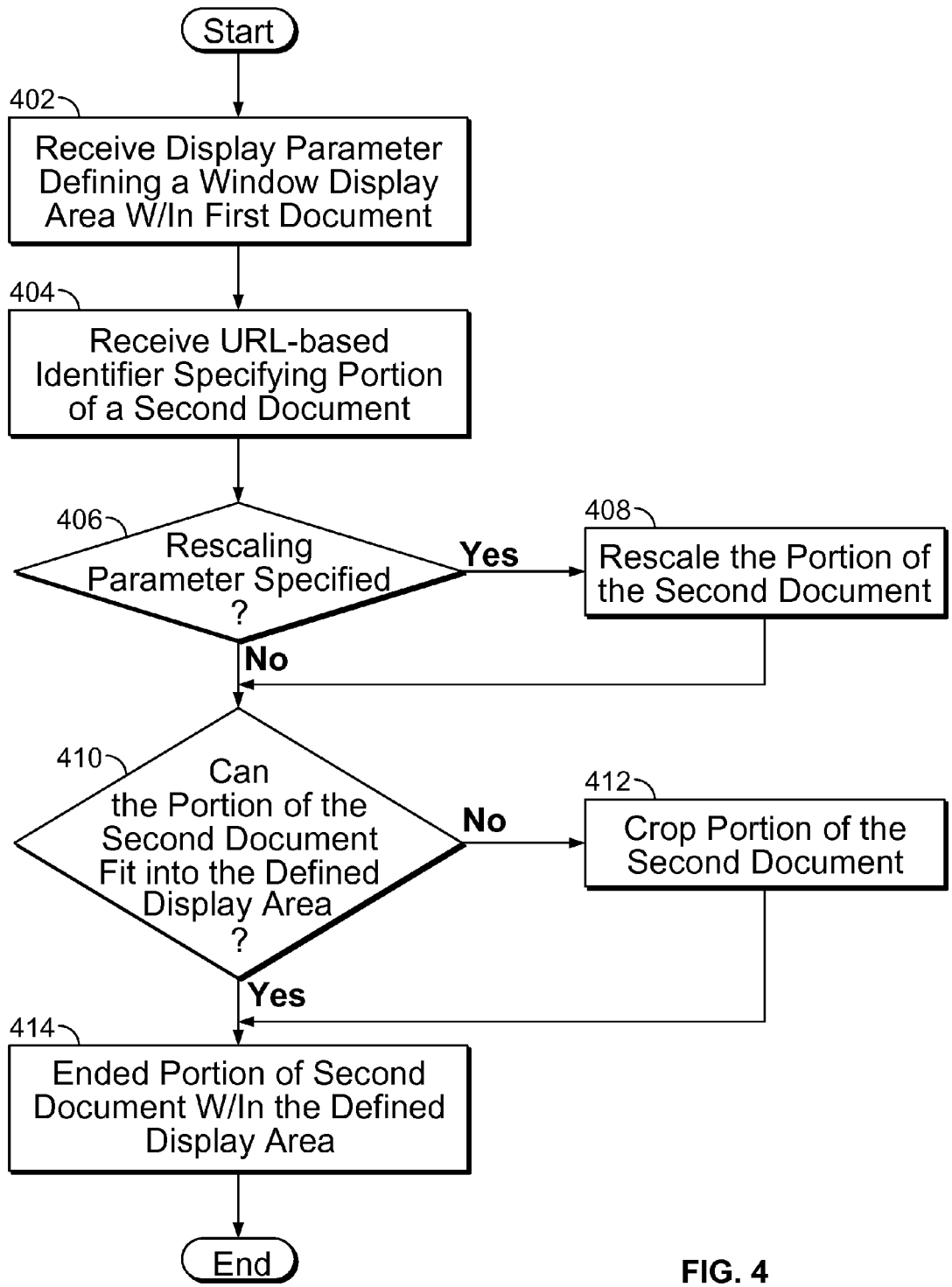
FIG. 4 is a flowchart showing the steps taken for recursive embedding by URL parameterization in accordance with an embodiment.

FIG. 4 is a flowchart showing the steps taken for recursive embedding by URL parameterization in accordance with an embodiment. Input may be received from a user or from one or more components of a network, such as network 100 of the cloud environment discussed with respect to FIGS. 1 & 2. At step 402, a display parameter defining a window display area within a portion of a first document associated with a first application having a first format is received. For example, the display parameter may include the Cartesian coordinates for a window display area, a rescaling parameter, a clipping parameter, or other parameter that defines a window display area, such as a rectangular area or a pop-up display on a computer display device (e.g., a user equipment screen or computer monitor). At step 404, a URL-based identifier specifying a portion of a second document associated with a second application having a second format is received. In one embodiment, such as within the cloud-based environment of FIGS. 1 & 2, the first and second formats may be different from each other. For example, the first application may support documents formatted for executable spreadsheet functions (i.e., a spreadsheet application), while the second application may support documents formatted for executable presentation functions (i.e., a presentation application).

In one embodiment, the second document can be rescaled based on a rescaling parameter. At step 406, if a rescaling parameter is specified, the portion of the second document may be rescaled at 408.

If a rescaling parameter is not specified, the second document may be cropped to fit the defined display area. At step 410, if the portion of the second document cannot fit into the defined display area, the portion of the second document is cropped at step 412.

When the selected portion of the second document correlates with the defined display area, at step 414, the portion of the second document is within the defined display area.

As the recursive process is dependent on the second (embedded) application for content execution, the method may then return to step 402 and repeat steps 404 through 414 for each successive embedded application document. As such, the embedded and host application documents may be independently executable with respect to each other.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 4. Certain steps of the methods described herein, including one or more of the steps of FIG. 4, may be performed by a server or by another processor in a network-based cloud-computing system. Certain steps of the methods described herein, including one or more of the steps of FIG. 4, may be performed by a client computer in a network-based cloud computing system. The steps of the methods described herein, including one or more of the steps of FIG. 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
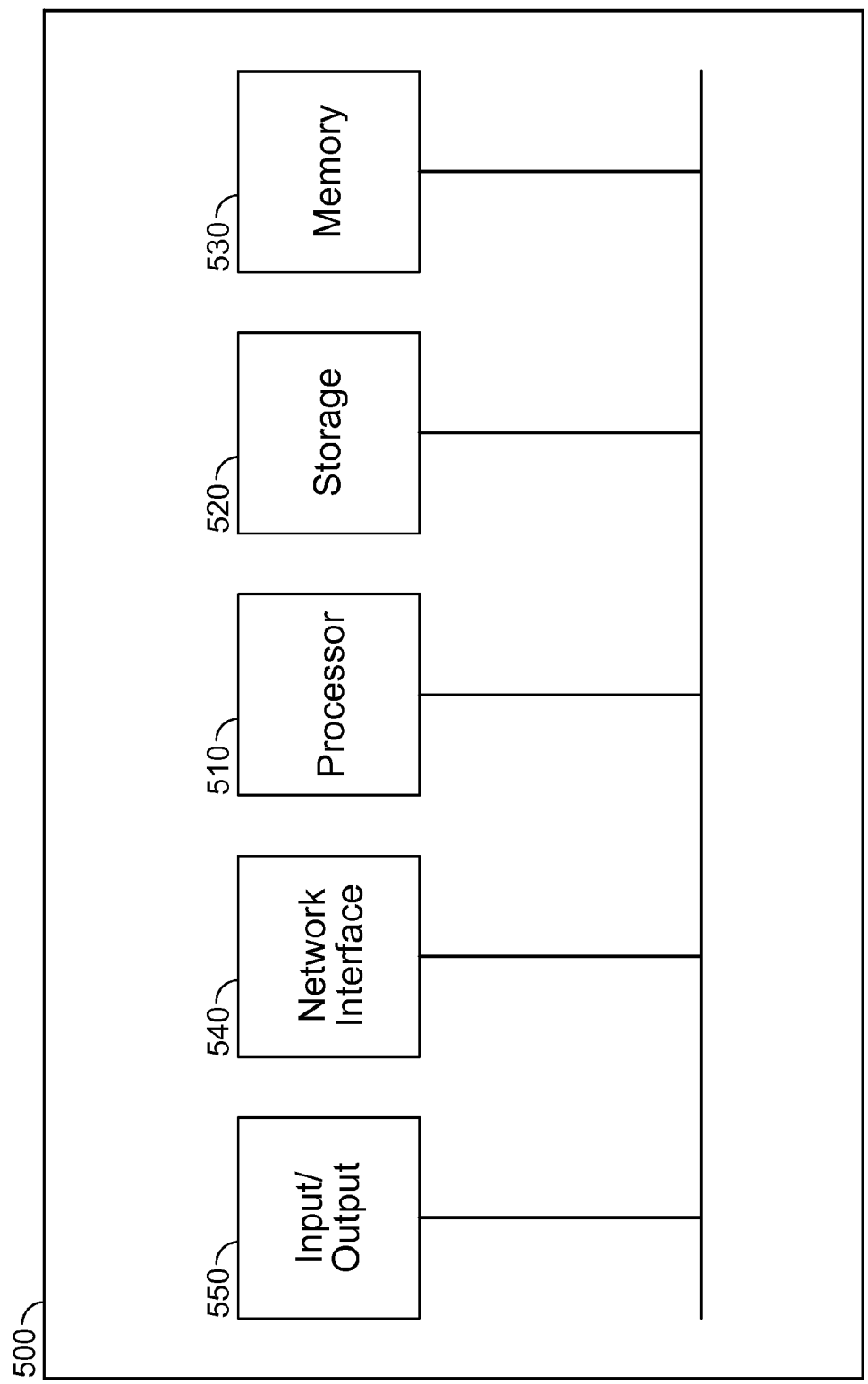
FIG. 5 is a high-level block diagram of an exemplary computer that may be used for implementing recursive embedding by URL parameterization.

FIG. 5 is a high-level block diagram of an exemplary computer that may be used for implementing recursive embedding by URL parameterization. Computer 500 comprises a processor 510 operatively coupled to a data storage device 520 and a memory 530. Processor 510 controls the overall operation of computer 500 by executing computer program instructions that define such operations. The computer program instructions may be stored in data storage device 520, or other computer readable medium, and loaded into memory 530 when execution of the computer program instructions is desired. Thus, the method steps of FIG. 4 can be defined by the computer program instructions stored in memory 530 and/or data storage device 520 and controlled by processor 510 executing the computer program instructions. For example, the computer program instructions can be implemented as computer executable code programmed by one skilled in the art to perform an algorithm defined by the method steps of FIG. 4. Accordingly, by executing the computer program instructions, the processor 510 executes an algorithm defined by the method steps of FIG. 4. Computer 500 also includes one or more network interfaces 540 for communicating with other devices via a network. Computer 500 also includes one or more input/output devices 550 that enable user interaction with computer 500 (e.g., display, keyboard, mouse, speakers, buttons, etc.).

Processor 510 may include both general and special purpose microprocessors, and may be the sole processor or one of multiple processors of computer 500. Processor 510 may comprise one or more central processing units (CPUs), for example. Processor 510, data storage device 520, and/or memory 530 may include, be supplemented by, or incorporated in, one or more application-specific integrated circuits (ASICs) and/or one or more field programmable gate arrays (FPGAs).

Data storage device 520 and memory 530 each comprise a tangible non-transitory computer readable storage medium. Data storage device 520, and memory 530, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 550 may include peripherals, such as a printer, scanner, display screen, etc. For example, input/output devices 550 may include a display device such as a cathode ray tube (CRT), plasma or liquid crystal display (LCD) monitor for displaying information to the user, a keyboard, and a pointing device such as a mouse or a trackball by which the user can provide input to computer 500.

Any or all of the systems and apparatus discussed herein, may be implemented using a computer such as computer 500.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

I claim:
1. A method, comprising:
receiving, at a processor, a request to display a first document having a first format, the first document being generated by a first application;
receiving, after the first application generates the first document, a URL-based identifier comprising a display parameter defining a window display area within a first portion of the first document, wherein the URL-based identifier specifies a second portion of a second document having a second format and being associated with a second application, wherein the first and second formats are different from each other;
linking the first document to the second application via the URL-based identifier to display the specified second portion of the second document within the window display area; and
in response to receiving the URL-based identifier, executing the second application independently of the first application to generate a display of the first portion of the first document including the window display area based on the display parameter, wherein the specified second portion of the second document is displayed within the window display area based on the URL-based identifier, and wherein generating the display of the window display area comprises rescaling or cropping the specified second portion of the second document based on the display parameter.

2. The method of claim 1, wherein the first and second applications are cloud-based applications.

3. The method of claim 1, further comprising cropping the specified portion of the second document based on a cropping parameter.

4. The method of claim 1, wherein the URL-based identifier includes one of a time-based range, cell range, document range or spatial parameter.

5. An apparatus, comprising:
an interface to:
receive, a request to display a first document having a first format, the first document being generated by a first application;
receive, after the first application generate the first document, a URL-based identifier comprising a display parameter defining a window display area within a first portion of the first document, wherein the URL-based identifier specifies a second portion of a second document having a second format and being associated with a second application, wherein the first and second formats are different from each other;
link the first document and the second application via the URL-based identifier to display the specified second portion of the second document within the window display area; and
a processor to, in response to receiving the URL-based identifier, execute the second application independently of the first application to generate a display of the first portion of the first document including the window display area based on the display parameter, wherein the specified second portion of the second document is displayed within the window display area based on the URL-based identifier, and rescale or crop the specified second portion of the second document based on the display parameter.

6. The apparatus of claim 5, wherein the first and second applications are cloud-based applications.

7. The apparatus of claim 5, further comprising the specified portion of the second document based on a cropping parameter.

8. The apparatus of claim 5, wherein the URL-based identifier includes one of a time-based range, cell range, document range or spatial parameter.

9. An article of manufacture including a non-transitory computer-readable medium having instructions stored thereon, that in response to execution by a computing device causes the computing device to perform operations comprising:

receiving, at a processor, a request to display a first document, having a first format, the first document being generated by a first application;

receiving, after the first application generates the first document, a URL-based identifier comprising a display parameter defining a window display area within a first portion of the first document, wherein the URL-based identifier specifies a second portion of a second document having a second format associated with a second application, wherein the first and second formats are different from each other;

linking the first document to the second application via the URL-based identifier to display the specified second portion of the second document within the window display area; and in response to receiving the URL-based identifier, executing the second application independently of the first application to generate a display of the first portion of the first document including the window display area based on the display parameter, wherein the specified second portion of the second document is displayed within the window display area based on the URL-based identifier, and rescaling or cropping the specified second portion of the second document based on the display parameter.

10. The computer-readable medium of claim 9, wherein the first and second applications are cloud-based applications.

11. The computer-readable medium of claim 9, said instructions further causing the computing device to perform operations comprising cropping the specified portion of the second document based on a cropping parameter.

12. The computer-readable medium of claim 9, wherein the URL-based identifier includes one of a time-based range, cell range, document range or spatial parameter.

* * * * *